United States Patent [19]

Huynh

[11] Patent Number: 6,026,848

[45] Date of Patent: *Feb. 22, 2000

[54] PRESSURE RELIEF VALVE

[75] Inventor: Tho Huynh, Southampton, United Kingdom

[73] Assignee: Stant Manufacturing Inc., Connersville, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 09/038,428

[22] Filed: Mar. 11, 1998

[30] Foreign Application Priority Data

Mar. 15, 1997 [GB] United Kingdom ................ 9705409

[51] Int. Cl.[7] ................................................ F16K 17/26
[52] U.S. Cl. .................................. 137/493.9; 137/493.6; 137/493.1; 220/203.24
[58] Field of Search ............................. 137/493.9, 493.6, 137/493.1, 493; 220/203.24, 203.25, DIG. 33, DIG. 32

[56] References Cited

U.S. PATENT DOCUMENTS

| 1,153,770 | 9/1915 | Daymon | 137/493.6 |
|---|---|---|---|
| 2,045,780 | 6/1936 | Jett | 137/493.6 |
| 3,441,050 | 4/1969 | Sanchez | 137/493.6 |
| 3,722,535 | 3/1973 | Raupp | 137/493.6 |
| 3,724,707 | 4/1973 | Burgess . | |
| 3,809,117 | 5/1974 | Oota | 137/493.6 |
| 4,044,791 | 8/1977 | McKenzie | 137/493.9 |
| 4,133,346 | 1/1979 | Smith et al. | 137/493.6 |
| 4,498,493 | 2/1985 | Harris | 137/493.6 X |
| 4,572,396 | 2/1986 | Kasugai et al. | 220/203.25 |
| 4,691,734 | 9/1987 | Fort | 137/493.6 |
| 5,183,075 | 2/1993 | Stein | 137/493.6 |
| 5,480,055 | 1/1996 | Harris | 220/203.26 |
| 5,540,347 | 7/1996 | Griffin | 137/493.1 |
| 5,582,198 | 12/1996 | Nagino et al. | 137/493.6 X |

FOREIGN PATENT DOCUMENTS

| 22 07 210 | 11/1972 | Germany . | |
| 86 05 367 U | 2/1987 | Germany . | |
| 6690 | 3/1902 | United Kingdom | 137/493.6 |
| 1019098 | 2/1966 | United Kingdom . | |

*Primary Examiner*—Denise L. Ferensic
*Assistant Examiner*—Joanne Y. Kim
*Attorney, Agent, or Firm*—Barnes & Thornburg

[57] ABSTRACT

A pressure relief valve assembly has a tubular body (10) with an internally projecting first valve seat (34, 80). An annular seal carrier (22) supports a resilient seal (24) which is spring-biased into engagement with the first valve seat (34). A movable valve member (44) has a second valve seat (46) which is spring-biased into engagement with the resilient seal (24), the range of movement of the movable valve member (44) towards the resilient seal (24) being limited by an abutment formation (52) which engages with a complementary formation (54) on the body (10). The resilient seal (24) comprises a body portion (26) abutting the seal carrier (22), a first lip portion (32) capable of flexing movement relative to the body portion (26) and adapted to engage with the first valve seat (34) and a second lip portion (48) capable of flexing movement relative to the body portion (26) and adapted to engage with the second valve seat (46).

58 Claims, 6 Drawing Sheets

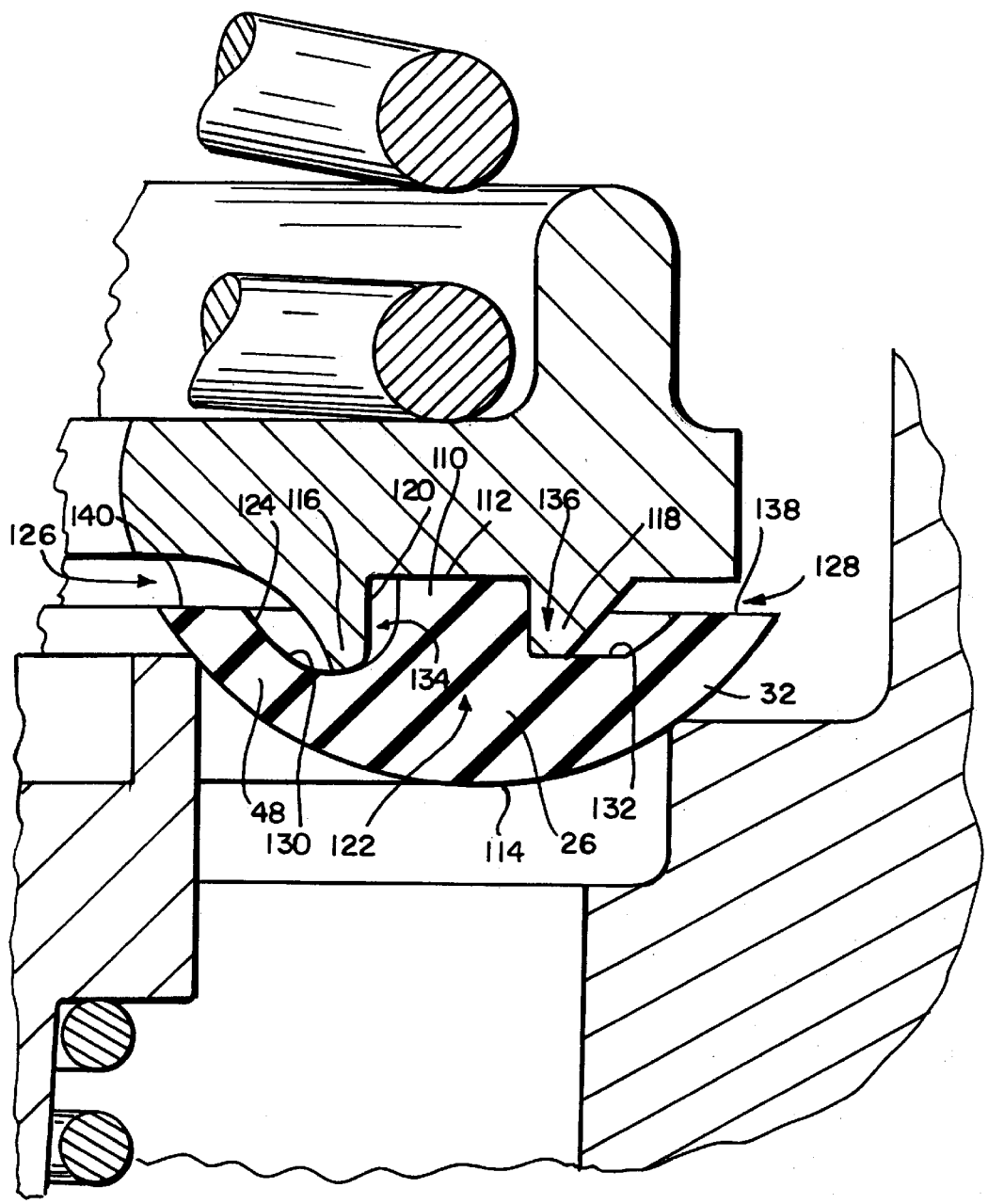
Fig.3. B 6,026,848

PRESSURE RELIEF VALVE

FIELD

This invention relates to a pressure relief valve assembly of the type adapted both to relieve both positive and negative excess pressure across such valve assembly.

RELATED ART

GB-A-1,019,098 discloses a valve assembly of this type having a seal in the form of a flat annular disc. Such a disc is of limited compressibility. In addition, there is a risk of debris building up on the mating flat surfaces and thereby impairing reliable sealing. Also, when the seal is arranged to mate with moulded plastics valve seats, it is difficult to ensure that surfaces of plastic mouldings are truly flat. The present invention aims to provide a valve assembly which is not subject to these disadvantages.

The invention has particular application to a pressure relief valve assembly for the fuel tank of a motor vehicle. Such a valve assembly is required to be liquid-proof so as to avoid fuel from splashing out of the tank during travel, particularly when the tank is full. It must perform two functions. One function is to relieve the excess vapour pressure which can build up when the fuel in the tank is warm, for example due to a rise in ambient temperature. The other function is to relieve the reduced pressure which forms either when the fuel cools or as fuel is drawn off.

SUMMARY OF THE INVENTION

According to the invention, a pressure relief valve assembly comprises a tubular body having an internally projecting first valve seat, an annular seal carrier supporting a resilient seal, a first spring engaging between the body and the seal carrier to urge the seal into engagement with the first valve seat, a movable valve member having a second valve seat, a second spring engaging between the body and the valve member for urging the second valve seat into engagement with the resilient seal, wherein the movable valve member has an abutment formation adapted to engage with a complementary formation on the body to limit the range of movement of the movable valve member towards the resilient seal, and the resilient seal comprises a body portion abutting the seal carrier, a first lip portion capable of flexing movement relative to the body portion and adapted to engage with the first valve seat and a second lip portion capable of flexing movement relative to the body portion and adapted to engage with the second valve seat.

BRIEF DESCRIPTION OF THE DRAWINGS

FIG. 3B is an enlarged sectional view of a portion of the resilient seal;

DETAILED DESCRIPTION OF THE PREFERRED EMBODIMENT

Figure 1:
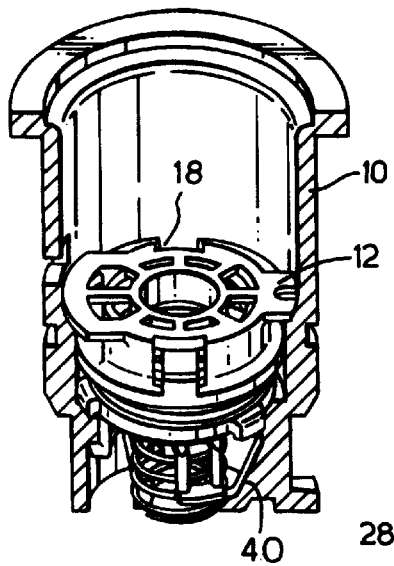
FIG. 1 is a partially broken away perspective view of a valve assembly in accordance with a first embodiment of the invention.
Figure 1:
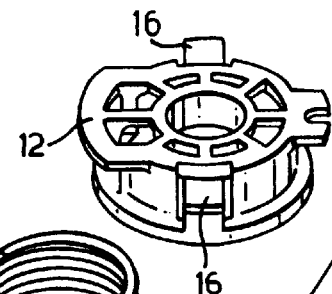
Figure 2:
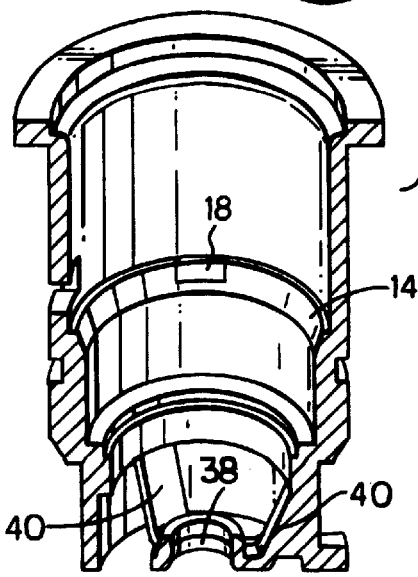
FIG. 2 is an exploded perspective view of the valve assembly shown in FIG. 1.

Referring to FIGS. 1 to 3A, a fuel filler pipe cap has a cylindrical body 10 adapted to be received in the filler pipe of a motor vehicle fuel tank (not shown). The upper part of the body 10 accommodates a locking mechanism (not shown) for securing the fuel cap in the filler pipe neck. The lower part of the body 10 accommodates a valve assembly in accordance with the invention.

The valve assembly comprises a valve retainer 12 which is supported on a shoulder 14 within the body 10 and has two resilient lugs 16 which engage in respective diametrically opposed slots 18 (only one of which is visible in FIGS. 1 and 2) in the inner side wall of the body 10. The retainer 12 has numerous openings allowing free flow of air and vapour therethrough.

An upper compression spring 20 engages between the underside of the retainer 12 and a seal carrier 22 which carries a resilient seal 24 on its lower side. As can be seen from FIG. 2, the seal 24 has a body portion 26 with six upwardly extending projections such as the projection 28 which engage in complementary slots 30 in the seal carrier 22 so as to retain the seal 24 captive thereon. As can be seen from FIG. 3A, the seal 24 has a first lip 32 which projects radially outwardly from the body portion 26 and which is urged by the upper spring 20 into engagement with an edge 34 on a second shoulder 36 on the interior wall of the body 10.

A spring seat 38 is formed integrally with the body 10 and connected to the bottom end thereof by three legs 40, only two of which are visible in the drawings. The spring seat 38 supports a lower compression spring 42 which engages with a moving valve member 44 to urge a radially outer upper edge 46 of the latter into engagement with a second, radially inwardly extending, lip 48 of the seal 24. The movable valve member 44 has three side legs 50 with outwardly projecting feet 52 on their bottom ends. The feet 52 can engage with a downwardly facing shoulder 54 on the inner side wall of the body 10.

The lower surfaces of the two lips 32 and 48 together form a convex surface of toroidal shape which make line contact with and the edges 34 and 46.

As shown in FIG. 3B, seal 24 further includes an annular rim 110 coupled to body portion 26 including an axially outmost portion 112 of seal 24. Annular rim 110 extends outwardly from body portion 26 and is radially centered between two lips 32, 48. Body portion 26 includes an axially innermost portion 114 of seal 24 that is radially centered between lips 32, 48.

Seal carrier 22 includes first and second projections 116, 118 that extend axially inward and cooperate to define a groove 120 and an opening 122 into groove 120 that accepts annular rim 110. Seal 24 further includes an axially outer surface 124 that cooperates with seal carrier 22 to define first and second gaps 126, 128 therebetween. Portions 130, 132 of surface 124 are curved to define grooves 134, 136 in seal 24. Lip 32 extends axially and radially outward of body portion 26 and has an axially outermost portion 138 that is positioned axially outward of portion 130 of surface 124. Lip 48 extends axially outward and radially inward of body portion 26 and has an axially outermost portion 140 that is positioned axially outward of portion 132 of surface 124.

Figure 3A:
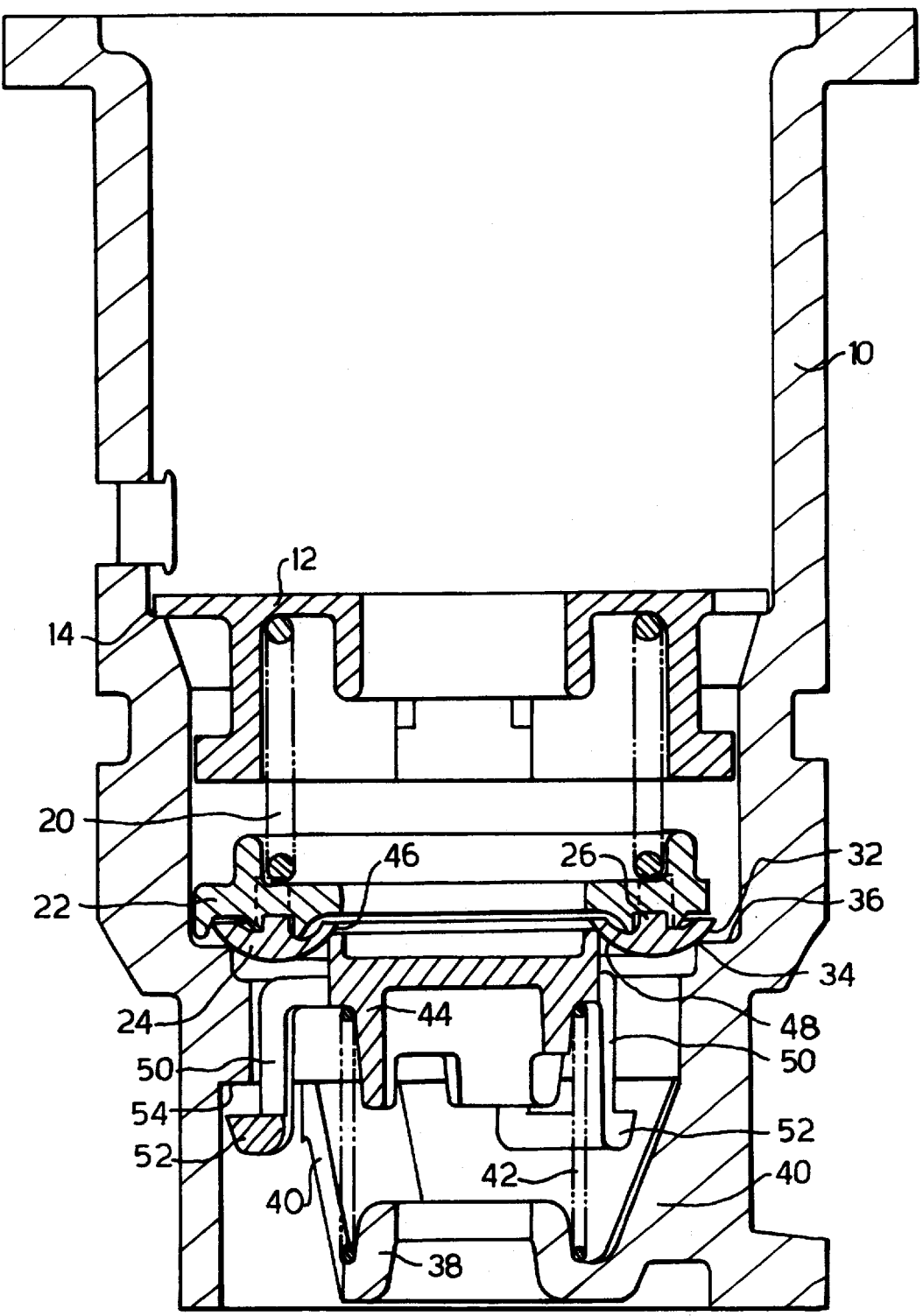
FIG. 3A is a longitudinal sectional view of the valve assembly shown in FIG. 1, showing the resilient seal engaging with both valve seats.
Figure 4:
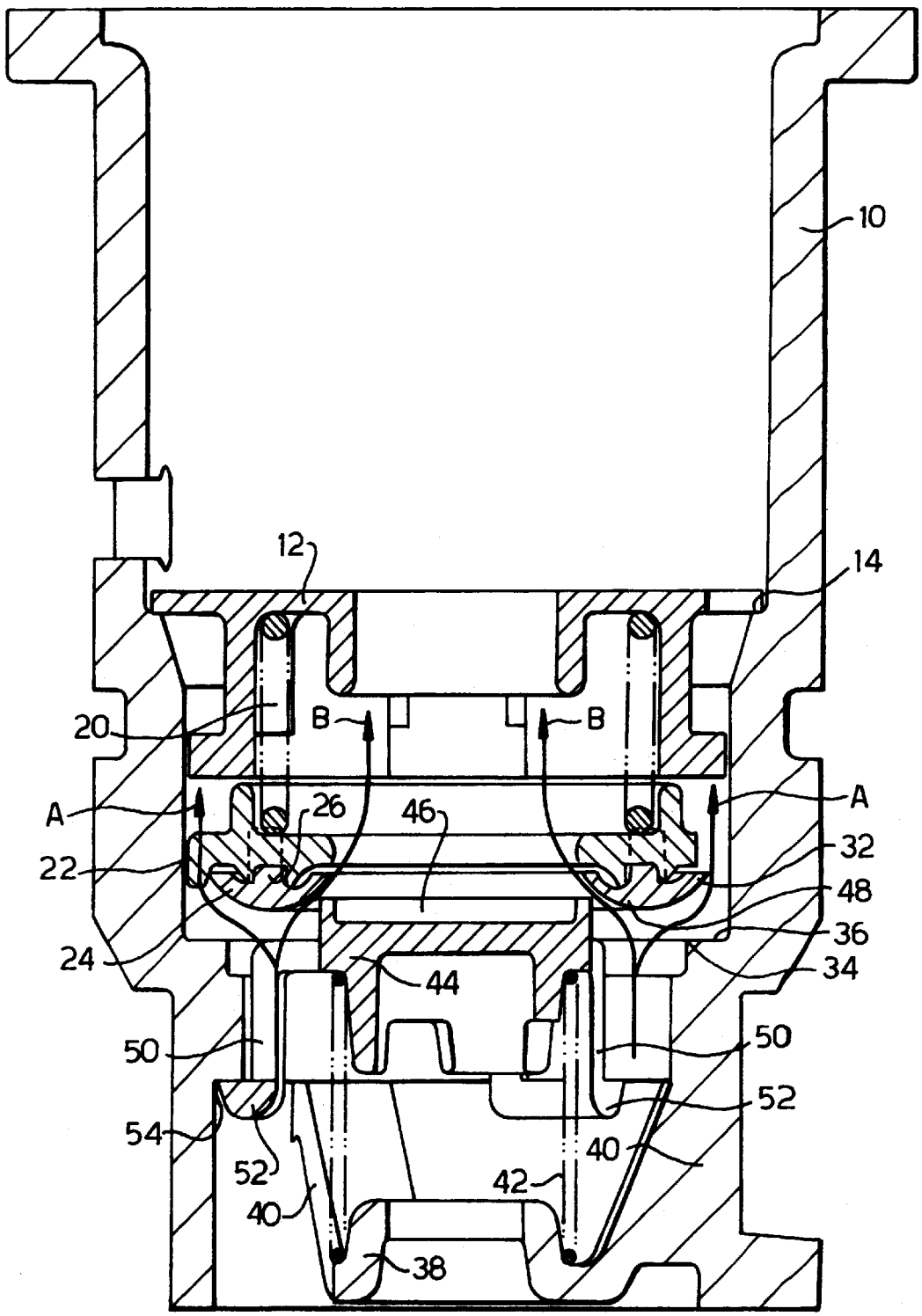
FIG. 4 is a cross-sectional view, similar to FIG. 3A, but showing the valve open to relieve excess pressure within the tank.

FIG. 3A shows the valve in its closed condition, the passageway through the body 10 being blocked by the shoulder 36, the seal 24 and the movable valve member 44. If pressure builds up below the valve (as shown in the drawings), this pressure acts on the movable valve member 44, lifting it, and the seal carrier 22, upwards against the action of the upper spring 20 but assisted by the lower spring 42, so as to allow air and vapour to escape between the valve 24 and the edge 34, as illustrated by the arrows A in FIG. 4.

The extent of upward movement of the movable valve member 44 is limited by engagement of its feet 52 with the shoulder 54. If the flow path indicated by the arrows A is insufficient to relieve the excess pressure, the valve carrier 22 moves further upwards against the spring 20 so that the seal 24 disengages from the edge 46 of the movable valve member 44 so as to open an additional flow path illustrated by the arrows B.

As soon as the excess pressure is received, the seal 24 is returned to the position illustrated in FIG. 3, closing the valve.

Figure 5:
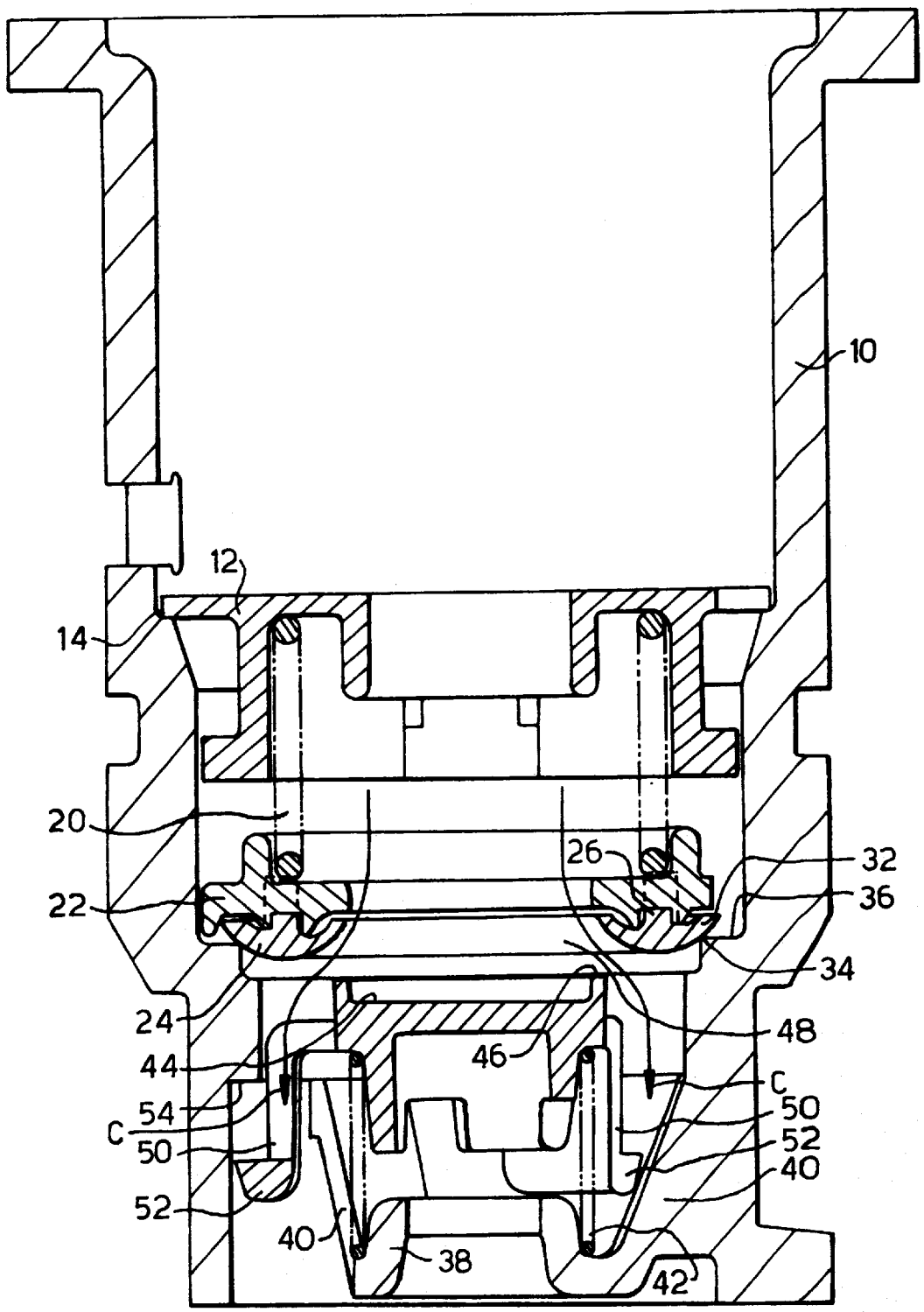
FIG. 5 is a cross-sectional view, similar to FIGS. 3A and 4, but showing the valve open to relieve reduced pressure within the tank.

If the pressure below the valve reduces below atmospheric pressure, then the pressure difference across the movable valve member 44 causes the latter to move downwards against the action of the lower spring 42. Equivalent downward movement of the seal 24 is prevented by its engagement with the edge 34, with the result that a flow path illustrated by the arrows C in FIG. 5 opens between the seal 24 and the edge 46 of the movable valve seat 44. When the pressure in the tank returns to atmospheric pressure, the spring 42 returns the movable valve seat 44 to the position shown in FIG. 3, closing the valve.

Figure 6:
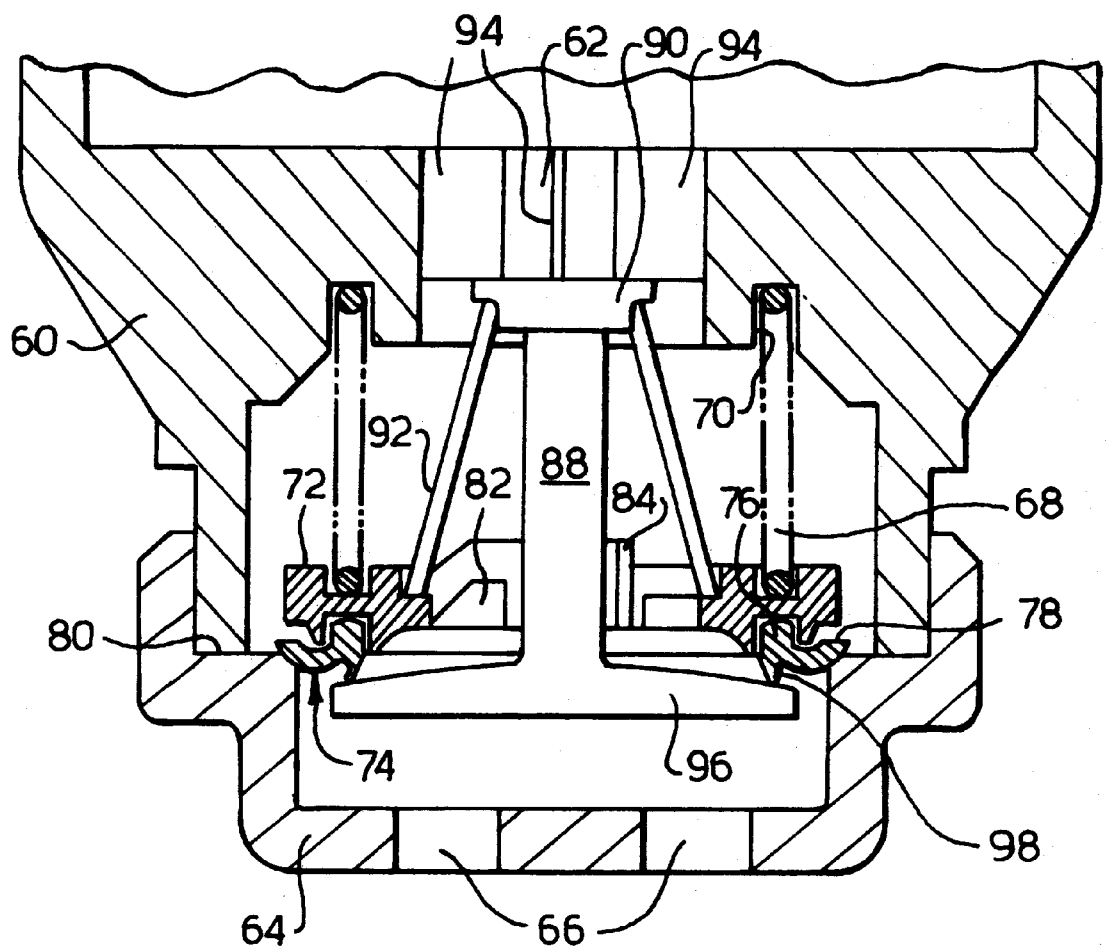
FIG. 6 is a cross-sectional view, similar to FIG. 3A, of a valve assembly in accordance with a second embodiment of the invention.

FIG. 6 shows the lower part of a valve body 60 of a valve in accordance with another embodiment of the invention. The upper part of the valve body 60 is similar to the upper part of the valve body 10 of FIGS. 1 to 5. The valve body 60 has a central opening 62 through which air and vapour can flow freely. The lower end of the body 60 is closed by a bottom cover 64 which has holes 66 through which air and vapour can flow freely.

A main compression spring 68 engages between an annular pocket 70 surrounding the central hole 62 in the body 60, and a seal carrier 72 which has a resilient seal 74 on its lower side. The seal 74 has upwardly extending projections (not shown) similar to the projections 26 of the seal 24 (FIG. 2) which engage in complementary slots (not shown) in the seal carrier 72. The seal 74 has a first lip 78 which projects radially outwardly from the body portion 76 and which is urged by the spring 68 into engagement with a shoulder 80 on the interior wall of the body 60.

The seal carrier 72 has a central hole 82 allowing passage of air and vapour. Three radially extending legs 84 (only two of which are visible in FIG. 6) provide lateral guidance for an axially slidable stem 88 which has a flange 90 on its upper end. A second compression spring 92 engages with the flange 90 and the upper surface of the seal carrier 72 so as to urge the flange 90 into abutment with radially projecting ribs 94 in the opening 62. The lower end of the stem 88 carries a second flange 96, the upper surface of which extends with a second downwardly extending lip 98 of the seal 74.

In the event that excessive pressure in the space below the valve is communicated to the seal carrier 72 through the holes 66, the main spring 68 is compressed so as to lift the lip 78 of the seal 74 clear of the shoulder 80, allowing the excess pressure air or vapour to flow out through the holes 62 and 66. On the other hand, in the event of reduced pressure (vacuum effect), the second spring 92 is compressed, allowing the lower flange 96 to disengage from the lip 98 so that air can flow in through the holes 62 and 66.

I claim:

1. A pressure relief valve assembly comprising
   a tubular body having an axis and a first valve seat, the tubular body defining a flow through passage,
   a seal carrier positioned to lie in the flow through passage and formed to include a groove,
   a seal coupled to the seal carrier,
   a first spring positioned to lie between the tubular body and the seal carrier to engage the seal with the first valve seat of the tubular body,
   a valve member positioned to lie in the flow passage and including a second valve seat, the groove of the seal carrier opening in an axially inward direction along the axis of the tubular body toward the valve member, and
   a second spring positioned to lie between the valve member and the tubular body to engage the second valve seat with the seal, the seal including a body portion, an annular rim coupled to the body portion and positioned to lie in the groove of the seal carrier, a first lip portion engageable with the first valve seat, and a second lip portion engageable with the second valve seat, the body portion extending along the axis of the tubular body and beyond the first and second lip portions in the axially inward direction.

2. A pressure relief valve according to claim 1, wherein the body portion, the first lip portion, and the second lip portion cooperate to define a convex surface.

3. A pressure relief valve according to claim 2, wherein the convex surface has a uniform radius of curvature.

4. A pressure relief valve according to claim 1, wherein the the annular rim is positioned to lie in an axial plane with the first and second lip portions.

5. A pressure relief valve according to claim 1, wherein one of the first and second lip portions cooperates with the seal carrier to define a first gap therebetween to facilitate resilient bending of said lip portion relative to the seal carrier.

6. A pressure relief valve according to claim 5, wherein the first lip portion cooperates with the seal carrier to define the first gap and the second lip portion cooperates with the seal carrier to define a second gap therebetween to facilitate resilient bending of the second lip portion relative to the seal carrier.

7. A pressure relief valve according to claim 5, wherein said lip portion includes a curved surface cooperating with the seal carrier to define the first gap and the curved surface has a uniform radius of curvature.

8. A pressure relief valve according to claim 1, wherein seal includes a first surface facing toward the seal carrier, a second surface facing away from the first surface, and a first groove defined by the first surface to facilitate resilient bending of one of the first and second lip portions and positioned to lie axially inward of an axially outermost portion of said lip portion.

9. A pressure relief valve according to claim 8, wherein the first groove facilitates resilient bending of the first lip portion, the seal includes a second groove defined by the first surface, spaced apart from the first groove, and positioned to lie axially inward of an outermost portion of the second lip portion.

10. The pressure relief valve according to claim 1, wherein the seal carrier further includes spaced-apart first and second axially extending projections cooperating to define the groove therebetween.

11. The pressure relief valve according to claim 1, wherein the annular rim is positioned between the first and second lip portions.

12. The pressure relief valve according to claim 1, wherein the seal includes a surface cooperating with the seal carrier to define a gap therebetween to facilitate resilient bending of one of the first and second lip portions relative to the seal carrier and an opening into the gap and a portion of the surface defining the gap is positioned to lie axially inward of the opening into the gap.

13. A pressure relief valve assembly comprising
a tubular body having an axis and a first valve seat, the tubular body defining a flow through passage,
a seal carrier positioned to lie in the flow through passage and formed to include a groove,
a seal coupled to the seal carrier,
a first spring positioned to lie between the tubular body and the seal carrier to engage the seal with the first valve seat of the tubular body,
a valve member positioned to lie in the flow passage and including a second valve seat, and
a second spring positioned to lie between the valve member and the tubular body to engage the second valve seat with the seal, the seal including a body portion, a first lip portion engageable with the first valve seat, a second lip portion engageable with the second valve seat, and an annular rim coupled to the body portion and positioned to lie between the first and second lip portions and extending into the groove of the seal carrier, the body portion extending along the axis of the tubular body and beyond the first and second lip portions in an axially inward direction toward the valve member.

14. A pressure relief valve according to claim 13, wherein the body portion, the first lip portion, and the second lip portion cooperate to define a convex surface having a uniform radius of curvature.

15. A pressure relief valve according to claim 13, wherein the annular rim is positioned to lie in an axial plane with the first and second lip portions.

16. A pressure relief valve according to claim 13, wherein the first lip portion cooperates with the seal carrier to define a gap therebetween to facilitate resilient bending of the first lip portion relative to the seal carrier.

17. A pressure relief valve according to claim 16, wherein the first lip portion cooperates with the seal carrier to define the first gap and the second lip portion cooperates with the seal carrier to define a second gap therebetween to facilitate resilient bending of the second lip portion relative to the seal carrier.

18. A pressure relief valve according to claim 16, wherein one of the first and second lip portions includes a curved surface cooperating with the seal carrier to define the gap, the curved surface has a uniform radius of curvature.

19. A pressure relief valve according to claim 13, wherein seal includes a first surface facing toward the seal carrier, a second surface facing away from the first surface, and a first groove defined by the first surface to facilitate resilient bending of one the first and second lip portions toward the seal carrier and a portion of the first surface that defines the first groove is positioned to lie axially inward of an axially outermost portion of said lip portion.

20. A pressure relief valve according to claim 19, wherein the first groove facilitates resilient bending of the first lip portion, the seal includes a second groove defined by the first surface, spaced apart from the first groove, and positioned to lie axially inward of an outermost portion of the second lip portion.

21. A pressure relief valve according to claim 13, wherein the first lip portion lies in an axial plane and the second lip portion lies in the same axial plane as the first lip portion.

22. A pressure relief valve according to claim 13, wherein the valve member is axially inward from the seal carrier, and the first valve seat of the tubular body is axially inward of the second valve seat of the valve member.

23. The pressure relief valve according to claim 13, wherein the annular rim is positioned to lie axially inward of the seal carrier.

24. The pressure relief valve according to claim 13, wherein an axially outermost portion of the seal is positioned radially between the first and second lip portions.

25. The pressure relief valve according to claim 24, wherein an axially innermost portion of the seal is positioned radially between the first and second lip portions.

26. The pressure relief valve according to claim 24, wherein the axially outermost portion of the seal is radially centered between the first and second lip portions.

27. A pressure relief valve assembly comprising
a tubular body having an axis and a first valve seat, the tubular body defining a flow through passage,
a seal carrier positioned to lie in the flow through passage and formed to include a groove and a groove opening into the groove,
a seal coupled to the seal carrier,
a first spring positioned to lie between the tubular body and the seal carrier to engage the seal with the first valve seat of the tubular body,
a valve member positioned to lie in the flow passage in a position axially inward of the seal carrier and including a second valve seat, and
a second spring positioned to lie between the valve member and the tubular body to engage the second valve seat with the seal, the seal including a body portion, a first lip portion engageable with the first valve seat, a second lip portion engageable with the second valve seat, and an annular rim coupled to the body portion and positioned to lie in the groove of the seal carrier, the first and second lip portions extending axially outward to position the first and second lip portions axially outward of the opening.

28. A pressure relief valve according to claim 27, wherein annular rim is positioned to lie in an axial plane with the first and second lip portions.

29. A pressure relief valve according to claim 27, wherein the one of the first and second lip portions cooperates with the seal carrier to define a first gap therebetween to facilitate resilient bending of said lip portion relative to the seal carrier.

30. A pressure relief valve according to claim 29, wherein the first lip portion cooperates with the seal carrier to define the first gap and the second lip portion cooperates with the seal carrier to define a second gap therebetween to facilitate resilient bending of the second lip portion relative to the seal carrier.

31. A pressure relief valve according to claim 29, wherein said lip portion includes a curved surface cooperating with the seal carrier to define the first gap and the curved surface has a uniform radius of curvature.

32. A pressure relief valve according to claim 27, wherein seal includes a first surface facing toward the seal carrier, a second surface facing away from the first surface, and a first groove defined by the first surface to facilitate resilient bending of one of the first and second lip portions toward the seal carrier and a portion of the first end surface that defines the first groove is positioned to lie axially inward of an axially outermost portion of said lip portion.

33. A pressure relief valve according to claim 32, wherein the first groove facilitates resilient bending of the first lip portion, the seal includes a second groove defined by the first surface and positioned to lie axially inward of an outermost portion of the second lip portion.

34. A pressure relief valve according to claim 27, wherein the first lip portions lies in an axial plane and the second lip portion lies in the same axial plane as the first lip portion.

35. A pressure relief valve according to claim 27, wherein the valve member is axially inward from the seal carrier, and the first valve seat of the tubular body is axially inward of the second valve seat of the valve member.

36. The pressure relief valve according to claim 27, wherein the seal includes an axially innermost portion positioned to lie radially between the first and second lip portions.

37. The pressure relief valve according to claim 36, wherein the axially innermost portion is radially centered between the first and second lip portions.

38. The pressure relief valve according to claim 27, wherein the seal includes an axially outermost portion positioned to lie on the annular rim.

39. The pressure relief valve according to claim 27, wherein the annular rim is positioned to lie between the first and second lip portions.

40. A pressure relief valve assembly comprising a tubular body having an axis and a first valve seat, the tubular body defining a flow through passage, a seal carrier positioned to lie in the flow through passage, a seal coupled to the seal carrier, a first spring positioned to lie between the tubular body and the seal carrier to engage the seal with the first valve seat of the tubular body, a valve member positioned to lie in the flow passage and including a second valve seat, and a second spring positioned to lie between the valve member and the tubular body to engage the second valve seat with the seal, the seal including a body portion, a first lip portion engageable with the first valve seat, a second lip portion engageable with the second valve seat, the body portion extending along the axis of the tubular body and beyond the first and second lip portions in an axially inward direction toward the valve member, one of the first and second lip portions cooperating with the seal carrier to define a first gap therebetween to facilitate resilient bending of said lip portion relative to the seal carrier.

41. The pressure relief valve according to claim 40, wherein the first lip portion cooperates with the seal carrier to define the first gap and the second lip portion cooperates with the seal carrier to define a second gap to facilitate resilient bending of the second lip relative to the seal carrier.

42. The pressure relief valve according to claim 40, wherein the seal includes a surface cooperating with the seal carrier to define the first gap and an opening into the first gap and a portion of the surface defining the first gap is positioned axially inward of the opening into the first gap.

43. The pressure relief valve according to claim 40, wherein the seal includes an axially innermost portion positioned to lie radially between the first and second lip portions.

44. The pressure relief valve according to claim 40, wherein the seal carrier includes spaced-apart first and second annular projections and a portion of the seal is positioned to lie between the first and second annular projections.

45. The pressure relief valve according to claim 40, wherein said lip portion includes a surface cooperating with the seal carrier to define the first gap and the surface includes an axially inner portion that is positioned axially inward of an axially outermost portion of said lip portion and radially between the axially outermost portion of said lip portion and the body portion.

46. The pressure relief valve according to claim 45, wherein the axially inner portion is curved.

47. A pressure relief valve assembly comprising a tubular body having an axis and a first valve seat, the tubular body defining a flow through passage, a seal carrier positioned to lie in the flow through passage, a seal coupled to the seal carrier, a first spring positioned to lie between the tubular body and the seal carrier to engage the seal with the first valve seat of the tubular body, a valve member positioned to lie in the flow passage and including a second valve seat, and a second spring positioned to lie between the valve member and the tubular body to engage the second valve seat with the seal, the seal including a body portion, a first lip portion engageable with the first valve seat, and a second lip portion engageable with the second valve seat, at least one of the first and second lip portions having a surface cooperating with the seal carrier to define a first gap therebetween to facilitate resilient bending of said lip portion relative to the seal carrier and an opening into the first gap, the surface of said lip portion having a portion defining the first gap positioned axially inward of the opening.

48. The pressure relief valve according to claim 47, wherein the first lip portion cooperates with the seal carrier to define the first gap and the second lip portion cooperates with the seal carrier to define a second gap to facilitate resilient bending of the second lip portion relative to the seal carrier.

49. The pressure relief valve according to claim 47, wherein the first lip portion includes an axially outermost surface terminating at an axial plane and the second lip portion includes an axially outermost surface terminating at the axial plane.

50. The pressure relief valve according to claim 47, wherein the seal includes an axially innermost portion positioned to lie radially between the first and second lip portions.

51. The pressure relief valve according to claim 47, wherein said lip includes a surface cooperating with the seal carrier to define the first gap and the surface includes an axially inner portion that is positioned axially inward of an axially outermost portion of said lip and radially between the axially outermost portion of said lip and the body portion.

52. The pressure relief valve according to claim 51, wherein the axially inner portion of the surface is curved.

53. A pressure relief valve assembly comprising a tubular body having an axis and a first valve seat, the tubular body defining a flow through passage, a seal carrier positioned to lie in the flow through passage and formed to include a groove, a seal coupled to the seal carrier, a first spring positioned to lie between the tubular body and the seal carrier to engage the seal with the first valve seat of the tubular body, a valve member positioned to lie in the flow passage in a position axially inward of the seal carrier and including a second valve seat, and a second spring positioned to lie between the valve member and the tubular body to engage the second valve seat with the seal, the seal including a first lip portion engageable with the first valve seat, a second lip portion engageable with the second valve seat, an axially outermost portion positioned to lie radially between the first and second lip portions, and an axially innermost portion positioned to lie radially between the first and second lip portions.

54. The pressure relief valve according to claim 53, wherein the axially outermost portion of the seal is radially centered between the first and second lip portions.

55. The pressure relief valve according to claim 53, wherein the axially innermost portion of the seal is radially centered between the first and second lip portions.

56. The pressure relief valve according to claim 53, wherein the seal includes a surface cooperating with the seal carrier to define a gap therebetween to facilitate resilient bending of one of the first and second lip portions.

57. The pressure relief valve according to claim 56, wherein the surface includes a portion defining the gap that is positioned axially inward of an axially outermost portion of said lip portion.

58. The pressure relief valve according to claim 56, wherein the surface includes a semicircular portion.

* * * * *